(12) United States Patent
Hsu et al.

(10) Patent No.: US 12,048,916 B2
(45) Date of Patent: Jul. 30, 2024

(54) CARBON FIBER COMPOSITES AND METHOD FOR PRODUCING THE SAME

(71) Applicant: FORMOSA PLASTICS CORPORATION, Kaohsiung (TW)

(72) Inventors: Yu-Cheng Hsu, Kaohsiung (TW); Tang-Chun Kao, Kaohsiung (TW); Long-Tyan Hwang, Kaohsiung (TW); Chih-Hsiang Liang, Kaohsiung (TW); Chien-Hsu Chou, Kaohsiung (TW); Yi-Chuan Chang, Kaohsiung (TW); Chih-Hsuan Ou, Kaohsiung (TW); Han-Chang Wu, Kaohsiung (TW)

(73) Assignee: FORMOSA PLASTICS CORPORATION, Kaohsiung (TW)

( * ) Notice: Subject to any disclaimer, the term of this patent is extended or adjusted under 35 U.S.C. 154(b) by 27 days.

(21) Appl. No.: 17/877,267

(22) Filed: Jul. 29, 2022

(65) Prior Publication Data
US 2023/0044426 A1 Feb. 9, 2023

(30) Foreign Application Priority Data

Jul. 30, 2021 (TW) .................................. 110128242

(51) Int. Cl.
*B01J 23/58* (2006.01)
*B01J 21/06* (2006.01)
(Continued)

(52) U.S. Cl.
CPC .............. *B01J 23/58* (2013.01); *B01J 21/063* (2013.01); *B01J 21/18* (2013.01); *B01J 35/23* (2024.01);
(Continued)

(58) Field of Classification Search
CPC . B01J 23/58; B01J 21/063; B01J 21/18; B01J 35/0013; B01J 35/004; B01J 35/06;
(Continued)

(56) References Cited

U.S. PATENT DOCUMENTS

| 6,121,191 A | 9/2000 | Komatsu et al. |
| 2007/0122687 A1* | 5/2007 | Sakurai ................ D04H 1/4242 423/447.2 |

(Continued)

FOREIGN PATENT DOCUMENTS

| CN | 1608727 A | * | 4/2005 | .............. B01J 21/06 |
| CN | 1608727 A | | 4/2005 | |

(Continued)

OTHER PUBLICATIONS

Youmgmi Koo et al., "Synthesis and characterization of Ag—TiO2-CNT nanoparticles composites with high photocatalytic activity under artificial light." Composites: Part B 57, pp. 105-111. (Year: 2014).*

(Continued)

*Primary Examiner* — Patricia L. Hailey
(74) *Attorney, Agent, or Firm* — MUNCY, GEISSLER, OLDS & LOWE, PC (57) ABSTRACT

The present invention relates to carbon fiber composites and a method for producing the same. By reducing specific transition metal ions with a specific concentration, the method for producing the carbon fiber composites can form nanoparticles of a transition metal on an outer surface of a titanium dioxide layer encapsulating a carbon fiber to produce the carbon fiber composites. The nanoparticles of the transition metal directionally contact the titanium dioxide layer, so that the carbon fiber composites have synergistically photocatalytic activity.

14 Claims, 3 Drawing Sheets

100

| coating a titanium dioxide precursor on a carbon fiber and performing a sintering treatment to form a titanium dioxide layer on an outer surface of the carbon fiber | — 110 |

↓

| preparing a solution containing transition metal ions | — 110 |

↓

| reducing the transition metal ions by using a reducing agent to form nanoparticles of a transition metal on an outer surface of the titanium dioxide layer, thereby producing the carbon fiber composites | — 130 |

(51) Int. Cl.
*B01J 21/18* (2006.01)
*B01J 35/23* (2024.01)
*B01J 35/39* (2024.01)
*B01J 35/58* (2024.01)
*B01J 37/02* (2006.01)
*B01J 37/08* (2006.01)
*B01J 37/16* (2006.01)
*C01B 3/04* (2006.01)

(52) U.S. Cl.
CPC .............. *B01J 35/39* (2024.01); *B01J 35/58* (2024.01); *B01J 37/0228* (2013.01); *B01J 37/0244* (2013.01); *B01J 37/08* (2013.01); *B01J 37/16* (2013.01); *C01B 3/042* (2013.01)

(58) Field of Classification Search
CPC .... B01J 37/0228; B01J 37/0244; B01J 37/08; B01J 37/16; C01B 3/042
USPC ........ 502/185, 337, 339, 350; 977/742, 745, 977/749
See application file for complete search history.

(56) References Cited

U.S. PATENT DOCUMENTS

| | | | |
|---|---|---|---|
| 2008/0050640 A1* | 2/2008 | Sun ..................... | H01M 4/8652 502/185 |
| 2011/0194990 A1* | 8/2011 | Hsu ...................... | B82Y 30/00 502/182 |
| 2012/0077672 A1* | 3/2012 | Chu ..................... | H01M 4/925 977/773 |
| 2014/0030948 A1 | 1/2014 | Kim et al. | |
| 2018/0229219 A1* | 8/2018 | Islam ................... | B01J 35/006 |

FOREIGN PATENT DOCUMENTS

| | | | | |
|---|---|---|---|---|
| CN | 101347225 A | * | 1/2009 | ............. B01J 21/06 |
| CN | 101347725 A | | 1/2009 | |
| CN | 101513617 A | | 8/2009 | |
| CN | 101513617 B | | 12/2010 | |
| CN | 102945971 A | * | 2/2013 | ............. Y02E 60/50 |
| CN | 104888750 A | | 9/2015 | |
| CN | 108993506 | * | 12/2018 | ............. B01J 23/745 |
| CN | 108993506 A | | 12/2018 | |
| CN | 110565113 | * | 12/2019 | ............. C25B 11/04 |
| CN | 110565113 A | | 12/2019 | |
| CN | 110961091 A | | 4/2020 | |
| JP | S6-397234 | * | 4/1988 | ............. B01J 35/02 |
| JP | S6397234 A | | 4/1988 | |
| JP | H11-47611 A | | 2/1999 | |
| JP | H1147611 A | * | 2/1999 | ............. B01J 21/06 |
| JP | 2000-15112 A | | 1/2000 | |
| JP | 2000015112 A | * | 1/2000 | ......... B01J 20/3204 |
| JP | 2003-073997 | * | 3/2003 | ............. A61L 9/00 |
| JP | 2003-73997 A | | 3/2003 | |
| RU | 2243033 C1 | | 12/2004 | |
| WO | WO-2004/113251 A1 | | 12/2004 | |
| WO | WO2005045115 A1 | | 5/2005 | |

OTHER PUBLICATIONS

Feng-jun Zhang et al., "Photoelectrocatalytic properties of Ag-CNT/TiO2 composite electrodes for methylene blue degradation." New Carbon Materials, vol. 25, Issue 5, pp. 348-356, (Year: 2010).*

Ismail et al: "Photochemical splitting of water for hydrogen production photocatalysis: A review", Solar Energy Materials and Solar Cells, vol. 128, Sep. 30, 2014 (Sep. 30, 2014), XP029034297, ISSN: 0927-0248, DOI : 10.1016/J. SOLMAT.2014.04.037, pp. 85-101.

Yu-Lin Shen et al.; "Ultra-long Pt nanolawns supported on TiO2-coated carbon fibers as 3D hybrid catalyst for methanol oxidation"; Nanoscale Research Letters 2012, 7:237; pp. 1-5.

Jie Deng et al; "Fabrication of layered porous TiO2/carbon fiber paper decorated by Pt nanoparticles using atomic layer deposition for efficient methanol electro-oxidation"; Journal of Electroanalytical Chemistry 874 (2020) 114468; pp. 1-9.

* cited by examiner

CARBON FIBER COMPOSITES AND METHOD FOR PRODUCING THE SAME

RELATED APPLICATION

This application claims priority to an earlier Taiwan Application Serial Number 110128242, filed on Jul. 30, 2021 which is incorporated herein by reference in its entirety.

BACKGROUND

Field of Invention

The present invention relates to carbon fiber composites and a method for producing the same, and more particularly relates to the carbon fiber composites with synergistically photocatalytic activity and the method for producing the same.

Description of Related Art

Photocatalytic materials can converse light energy to chemical energy, so that the photocatalytic materials are widely applied in photocatalytic field, in which due to good photocatalytic activity, titanium dioxide is generally used. When used, the titanium dioxide is coated on a surface of a substrate to form composites which facilitates acceptation of light radiation and contact with reactants, thereby achieving a purpose of photocatalysis.

To enhance the photocatalytic activity of the titanium dioxide, conventional substrates are generally modified by active carbon and/or graphene, but it increases a complexity of manufacturing process for composites and decreases producing efficiency. In addition, the titanium dioxide only can photocatalyze one chemical reaction, but can not catalyze two or more reactions simultaneously. As the result, application value of the photocatalytic activity of the titanium dioxide is limited.

In view of these, it is necessary to develop a new method for producing composites to solve the aforementioned drawbacks of the composites.

SUMMARY

In view of the above problems, an aspect of the present invention is to provide a method for producing carbon fiber composites. In the method, by reducing specific transition metal ions with a specific concentration, nanoparticles of a transition metal can be form on an outer surface of a titanium dioxide layer encapsulating a carbon fiber to produce the carbon fiber composites. By direct contact between the nanoparticles of the transition metal and the titanium dioxide layer, the carbon fiber composites have synergistically photocatalytic activity.

Another aspect of the present invention is to provide a carbon fiber composite. The carbon fiber composite is produced by the aforementioned method.

According to an aspect of the present invention, a method for producing carbon fiber composites is provided. In the method, a titanium dioxide precursor is coated on a carbon fiber and a sintering treatment is performed to form a titanium dioxide layer on an outer surface of the carbon fiber. Next, a solution containing transition metal ions is prepared. Then, the transition metal ions are reduced by using a reducing agent to form nanoparticles of a transition metal on an outer surface of the titanium dioxide layer thereby producing the carbon fiber composites. The transition metal is at least one selected from the group consisted of nickel, palladium and platinum, and a concentration of the solution is 0.1 mg/mL to 4.0 mg/mL.

According to another embodiment of the present invention, the carbon fiber comprises a polyacrylonitrile-based carbon fiber.

According to yet embodiment of the present invention, a weight ratio of the titanium dioxide precursor and the carbon fiber is 10 to 40.

According to yet another embodiment of the present invention, a sintering temperature of the sintering treatment is 430° C. to 720° C.

According to yet another embodiment of the present invention, a concentration of the reducing agent is 0.25 mg/mL to 15 mg/mL.

According to yet another embodiment of the present invention, a particle size of the nanoparticles is not larger than 20 nm.

According to another aspect of the present invention, a carbon fiber composite is provided. The carbon fiber composite comprises a carbon fiber, a titanium dioxide layer encapsulating the carbon fiber and nanoparticles of a transition metal disposed on an outer surface of the titanium dioxide layer. The transition metal is at least one selected from the group consisted of nickel, palladium and platinum.

According to one embodiment of present invention, a particle size of the nanoparticles is not larger than 20 nm.

In an application of the method for producing the carbon fiber composites of the present invention, in which by reducing the specific transition metal ions with the specific concentration, the method can form the nanoparticles of the transition metal on the outer surface of the titanium dioxide layer encapsulating the carbon fiber to produce the carbon fiber composites. The carbon fiber composites have synergistically photocatalytic activity by direct contact between the nanoparticles of the transition metal and the titanium dioxide layer.

BRIEF DESCRIPTION OF THE DRAWINGS

Now please refer to description below and accompany with corresponding drawings to more fully understand embodiments of the present invention and advantages thereof. It has to be emphasized that all kinds of characteristics are not drawn in scale and only for illustrative purpose. The description regarding to the drawings as follows.

DETAILED DESCRIPTION

A manufacturing and usage of embodiments of the present invention are discussed in detail below. However, it could be understood that embodiments provide much applicable invention conception which can be implemented in various kinds specific contents. The specific embodiments discussed are only for illustration, but not be a limitation of scope of the present invention.

In a method for producing carbon fiber composites of the present invention, a titanium dioxide layer is first formed on an outer surface of a carbon fiber by a sintering treatment, and then nanoparticles of a transition metal was formed on an outer surface of the titanium dioxide layer by reducing specific transition metal ions with a specific concentration, therefore producing carbon fiber composites. The carbon fiber composites have the titanium dioxide layer and the nanoparticles of a transition metal on the outer surface of the titanium dioxide layer. The carbon fiber composites have synergistically photocatalytic activity by direct contact between the nanoparticles of the transition metal and the titanium dioxide layer.

The "synergistically photocatalytic activity" of the present invention refers to the "property" of the carbon fiber composites which can photocatalyze oxidation of organic compounds and decomposition of water molecules simultaneously to degrade organic compounds and generate hydrogen gas for fuel simultaneously. In detail, when light with a wavelength of 300 nm to 400 nm irradiates the titanium dioxide layer, electrons in a valence band of titanium dioxide of the titanium dioxide layer transits to a conduction band, and electron holes are produced in the valence band to cause oxidation potential difference. The oxidation potential difference can decompose water to hydrogen ion ($H^+$) and hydroxyl free radical ($\cdot OH^-$). The hydroxyl free radical also can oxidize the organic compounds to generate another hydrogen ion. In the process of the aforementioned decomposition of water, the titanium dioxide takes one electron from water molecule to fill the aforementioned electron hole.

The aforementioned two hydrogen ion (one is hydrogen ion generated from the decomposition of water, and the other is hydrogen ion generated from the oxidation of organic compounds) take one electron from the nanoparticles of the transition metal and are reduced to hydrogen gas. The nanoparticles of the transition metal from which the electron is taken take the aforementioned electron transiting to the conduction band. So, the electron undergoes a cycle. With continuous irradiation of the light and sufficiency of the compounds and water, the titanium dioxide layer and the nanoparticles of the transition metal used as photocatalysts do not be consumed, thus multiple cycles can continue.

In carbon fiber composites, the titanium dioxide layer and the nanoparticles of the transition metal are direct contact with each other, so that the electron can transport smoothly between the titanium dioxide layer and the nanoparticles of the transition metal, which facilitates the aforementioned cycles continuously goes on. That is to say, the photocatalytic activity of the carbon fiber composites can be greatly enhanced, therefore achieving the aforementioned synergistically photocatalytic activity. If the titanium dioxide layer and the nanoparticles of the transition metal are not direct contact with each other, the transportation of the electron has to depend on aid of ions in the solution, so the photocatalytic activity of the carbon fiber composites is decreased, and can not achieve the aforementioned synergistically photocatalytic activity.

Figure 1:
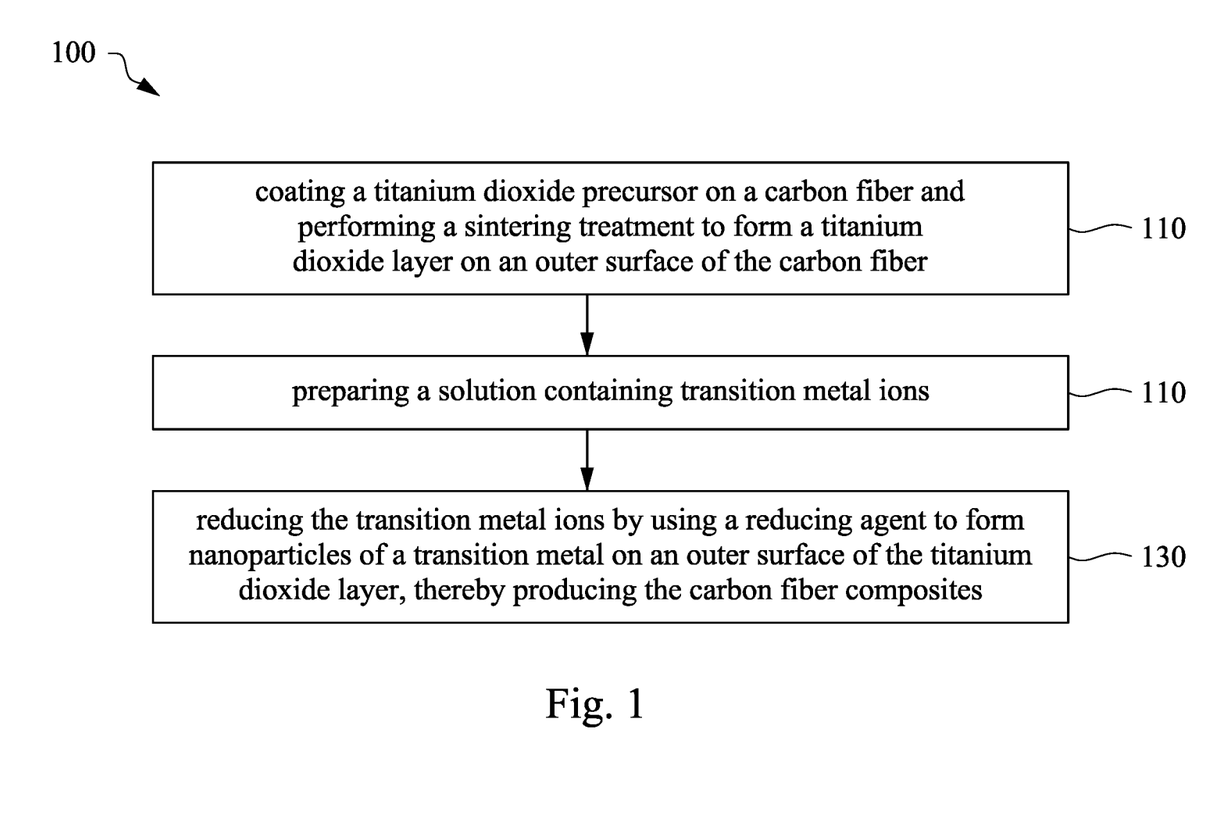
FIG. 1 illustrates a flow chart of a method for producing carbon fiber composites according to an embodiment of the present invention.

Referring to FIG. 1, in a method 100 for producing carbon fiber composites, a titanium dioxide precursor is coated on a carbon fiber and a sintering treatment is performed to form a titanium dioxide layer on an outer surface of the carbon fiber, as shown in an operation 110. A preparation of the titanium dioxide precursor of the present invention is not particularly limited, but the purpose is to form the titanium dioxide layer on the outer surface of the carbon fiber after the sintering treatment.

In some embodiments, the titanium dioxide precursor can be prepared by suing a sol-gel method. In specific examples of the sol-gel method, titanate ester and/or tetravalent titanium salts can be used to prepare a complex solution of the titanium dioxide, and non-aqueous solvents, organic acids and pure water are used to prepare an organic solution. Then, at 20° C. to 50° C., the organic solution is dropped into the complex solution of the titanium dioxide to form titanium dioxide nucleus, and they stands for a period (e.g. several hours), so that the titanium dioxide nucleus are grown to particles with stable size to obtain the titanium dioxide sol gel (i.e. the aforementioned titanium dioxide precursor).

In the specific examples, the aforementioned non-aqueous solvents can be anhydrous alcohol, and the organic acids can be organic acids with a carbon number not more than 3. The titanate ester can comprise but not limited to tetraethyl titanate, tetrabutyl titanate and tetrapropyl titanate, and the tetravalent titanium salts can be titanium isopropoxide.

In the specific examples, the size of the resulted titanium dioxide can be nanoscale or microscale. Preferably, the size of the titanium dioxide can be 10 nm to 20 nm to enhance synergistically photocatalytic activity of the carbon fiber composites.

In some embodiments, in the method 100 for producing the carbon fiber composites, hydrogen gas can be generated stably without using a sintering aid. The sintering aid is a salt with a low melting point, and can be copper sulfate, sodium sulfate, cobalt sulfate or manganese acetate.

In the method 100 for producing the carbon fiber composites, the carbon fiber is used as a substrate to load the titanium dioxide. In some embodiments, the carbon fiber is directly used as a substrate to load the titanium dioxide. In another specific examples, the carbon fiber can be woven into a fabric, and then the titanium dioxide precursor is loaded on the fabric with a great amount by using a coating method, thus a yield of the carbon fiber composites is increased and producing efficiency is enhanced. For example, the fabric can be a carbon fiber felt.

In some embodiments, the carbon fiber can comprise a polyacrylonitrile (PAN) based carbon fiber. Preferably, the carbon fiber is the polyacrylonitrile based carbon fiber. When the carbon fiber is the polyacrylonitrile based carbon fiber, the polyacrylonitrile based carbon fiber has a structure similar with graphene to facilitate a transportation of photelectrons in the titanium dioxide layer, thereby enhancing the synergistically photocatalytic activity of the carbon fiber composites.

In some embodiments, a loading amount of the titanium dioxide precursor is presented by a weight of the titanium dioxide precursor loaded on per unit area of the carbon fiber, such as 10 $g/cm^2$ to 20 $g/cm^2$. When the loading amount of the titanium dioxide precursor is in the aforementioned range, the resulted titanium dioxide layer has nanoscale thickness to enhance the photocatalytic activity of the titanium dioxide layer.

In some embodiments, a sintering temperature of the sintering treatment is 430° C. to 720° C., and preferably can be 450° C. to 700° C. When the sintering temperature is in the aforementioned range, a purity of the titanium dioxide layer can be increased, thus the photocatalytic activity of the titanium dioxide layer is enhanced, thereby enhancing the photocatalytic activity of the carbon fiber composites.

In some embodiments, a sintering period is 1 hour to 4 hours to facilitate to burn off organic compounds in the titanium dioxide layer, thus the photocatalytic activity of the titanium dioxide layer is enhanced, thereby enhancing the synergistically photocatalytic activity of the carbon fiber composites.

A wavelength of light absorbed by the nanoscale titanium dioxide in the titanium dioxide layer is 300 nm to 400 nm, the wavelength is in ultraviolet region, and thus the light absorbed by the nanoscale titanium dioxide can be provided by sunshine, thereby reducing cost. Besides, the aforementioned wavelength range is depended on a band gap of the nanoscale titanium dioxide, with comparison to other metal oxide, the nanoscale titanium dioxide has wider band gap (about 3.2 eV), and thus better photocatalytic activity can be provided. If the titanium dioxide is replaced with other metal oxide, the synergistically photocatalytic activity of the carbon fiber composites is reduced.

After the aforementioned operation 110, a solution containing transition metal ions is prepared, as shown in an operation 120. The solution containing the transition metal ions is not particularly limited, but the purpose is to be reduced by a reducing agent described below, and the solution is inert to the titanium dioxide layer, i.e. doesn't react with the titanium dioxide layer. In some embodiments, the solution containing the transition metal ions can be an aqueous solution containing halide of the transition metal, specific examples of the halide of the transition metal can be palladium chloride, nickel bromide and platinum iodide. For example, the solution containing the transition metal ions is prepared by using water to dissolve the halide of the transition metal.

In some embodiments, a concertation of the solution containing the transition metal ions can be 0.1 mg/mL to 4 mg/mL, and preferably 0.5 mg/mL to 1 mg/mL. If the concertation of the solution is not in the aforementioned range, the resulted nanoparticles of the transition metal disperse unevenly on the outer surface of the titanium dioxide layer, which reduces photocatalytic activity of the nanoparticles of the transition metal and further reduces the synergistically photocatalytic activity of the carbon fiber composites.

After the aforementioned operation 120, the transition metal ions are reduced by using a reducing agent to form the nanoparticles of the transition metal on the outer surface of the titanium dioxide layer, thereby preparing the carbon fiber composites, as shown in an operation 130.

Types of the reducing agent are not particularly limited, but the purpose is to reduce the transition metal ions. In some embodiments, the reducing agent can comprise, but is not limited to, hydroboron. Specific examples of the hydroboron can be lithium borohydride and sodium borohydride. In some specific examples, the reducing agent is dissolved in pure water at about 10° C., and then is used in a form of solution to avoid decreasing reducing ability of the reducing agent.

In some embodiments, a concentration of the reducing agent is 0.25 mg/L to 15 mg/L and preferably 3 mg/L to 12 mg/L. When the concentration of the reducing agent is in the aforementioned range, reducing agent is sufficient to reduce the transition metal ions to nanoscale particles to enhance the photocatalytic activity of the nanoparticles of the transition metal.

The transition metals are at least one selected from the group consisted of nickel, palladium and platinum. The transition metals belong to Group VIII elements and have the same (or similar) electron configuration (5s14d8), therefor electrons transiting to the conduction band are taken from the titanium dioxide in the titanium dioxide layer, so that the carbon fiber composites have the synergistically photocatalytic activity. If the transition metals are not nickel, palladium or platinum, the transition metals can not take the electrons transiting to the conduction band from the titanium dioxide in the titanium dioxide layer, thus the carbon fiber composites do not have the synergistically photocatalytic activity.

In some embodiments, the reducing agent is dropped into the solution containing the transition metal ions, and in the dropping process, the carbon fiber encapsulated by the titanium dioxide is sonicated with a sonication to help the nanoparticles of the transition metal evenly form on the outer surface of the titanium dioxide layer.

In some embodiments, a particle size of the nanoparticles of the transition metal is not larger than 20 nm, and preferably can be 5 nm to 15 nm. When the particle size of the nanoparticles of the transition metal is in the aforementioned range, the nanoparticles facilitate acceptation of electron transiting to the conduction band in the titanium dioxide of titanium dioxide layer, and the nanoparticles have large surface area, thereby enhancing the synergistically photocatalytic activity of the carbon fiber composites. In some specific examples, the photocatalytic activity of the carbon fiber composites which decomposes water to generate hydrogen gas can be evaluated by using an effusion rate of the hydrogen gas.

Figure 2A:
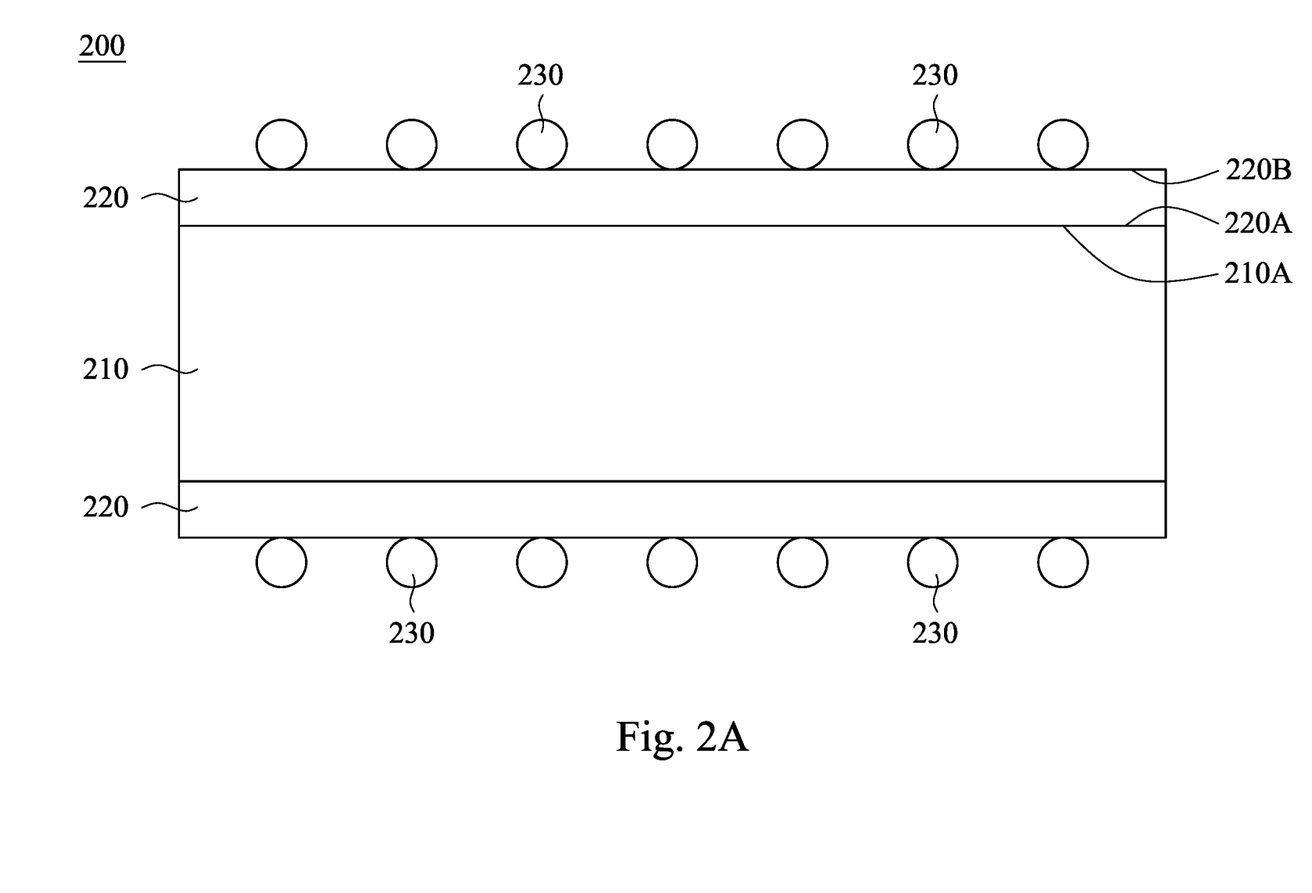
FIG. 2A and FIG. 2B individually illustrate a longitudinal-section and a cross-section of the carbon fiber composite according to an embodiment of the present invention.
Figure 2B:
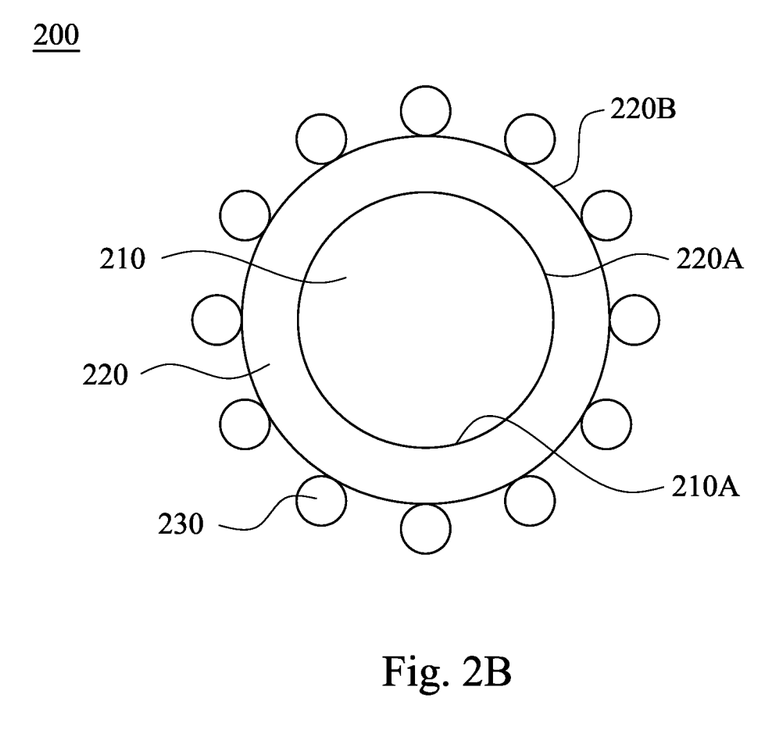

Referring to FIG. 2A and FIG. 2B, the two drawings individually illustrate schematic views of a longitudinal section and a cross section of structure of the carbon fiber composite in accordance with some embodiments of the present invention. The longitudinal section is a section taken along a direction parallel to an axial direction of the carbon fiber 210, and the cross section is a section taken along a direction perpendicular to the axial direction of the carbon fiber 210. The carbon fiber composite 200 produced by the aforementioned method comprises a carbon fiber 210, a titanium dioxide layer 220 and nanoparticles 230 of a transition metal. The carbon fiber 210 has an outer surface 210A, and the titanium dioxide layer 220 has an inner surface 220A and an outer surface 220B, wherein the inner surface 220A of the titanium dioxide layer 220 is contact with the outer surface 210A of the carbon fiber 210, so that the titanium dioxide layer 220 encapsulates the carbon fiber 210. The nanoparticles of the transition metal are disposed on an outer surface 220B of the titanium dioxide layer 220.

In some embodiments, a diameter of the carbon fiber 210 can be 5 μm to 8 μm. Preferable diameter can be 5 μm to 7 μm. When the diameter of the carbon fiber 210 is in the aforementioned range, it is beneficial to weaving the carbon fiber 210 into a fabric, which in turn facilitates mass production of the carbon fiber composite 200.

In some embodiments, a thickness of the titanium dioxide layer 220 can be in nanoscale, and preferably 20 nm to 40 nm. When the thickness of the titanium dioxide layer 220 is in the aforementioned range, the photocatalytic activity of the titanium dioxide layer 220 can be enhanced, therefore enhancing the synergistically photocatalytic activity of the carbon fiber composite 200.

The carbon fiber composite 200 can photocatalyze an oxidation of organic compounds (i.e., pollutants) and photocatalyze a decomposition of water molecule simultaneously, for degradation of the pollutants and generation of hydrogen gas for fuel simultaneously, and therefore the carbon fiber composite 200 can be applied to a combination of fuel cell field, and decomposition or catalysis of organic photocatalyst field, but is not limited to single field. In some application examples, the aforementioned photocatalytic reaction can be performed by using a light with wavelength of 300 nm to 400 nm.

In some application examples, the pollutants can comprise organic pollutants such as secondary amine, toluene, and formaldehyde to utilize the harmful pollutants to generate clean hydrogen gas for fuel, thereby creating the value of the pollutants.

The following embodiments are used to illustrate the applications of the present invention, but they are not used to limit the present invention, it could be made various changes or modifications for a person having ordinary sill in the art without aparting from the inspire and scope of the present invention.

Production of Carbon Fiber Composites

Embodiment 1

In the embodiment 1, at room temperature, 10 mL to 20 mL of tetraethyl titanate was added to 15 mL to 50 mL of anhydrous alcohol, and stirred until dissolved to obtain a solution containing titanium dioxide complexes. In addition, 10 mL to 50 mL of anhydrous alcohol, 10 mL to 40 mL of acetic acid and 5 mL to 15 mL of pure water were mixed to obtain an acetic acid solution. Next, at 20° C. to 50° C., the acetic acid solution was dropped into the solution containing titanium dioxide complexes under agitation and stood for 1 hour to 4 hours to obtain titanium dioxide sol gel.

At 100° C. to 160° C., a blocky carbon fiber felt (an area per unit weight is 1000 $m^2/g$ to 1600 $m^2/g$) was baked for 2 hours to 7 hours. Next, the titanium dioxide sol gel was coated evenly on the blocky carbon fiber felt, so that it absorbed the titanium dioxide sol gel, and the blocky carbon fiber felt was baked at 60° C. to 90° C. The absorption and the baking were repeated three times to obtain the carbon fiber felt coated with the titanium dioxide, in which a loading amount of the titanium dioxide precursor was present by a weight of the titanium dioxide precursor loaded per unit area of the carbon fiber, the loading amount was 10 $g/cm^2$ to 20 $g/cm^2$, a ratio of the titanium dioxide precursor and the carbon fiber was 10 to 40. In nitrogen atmosphere, the carbon fiber felt was heated at a rate of 2° C./min to 10° C./min to 450° C. to 700° C. of a sintering temperature. The carbon fiber felt was subjected to a calcination for 1 hour to 4 hours, and then cooled to a room temperature in nitrogen atmosphere to obtain the carbon fiber felt with the carbon fiber encapsulated by the titanium dioxide layer. A particle size of the titanium dioxide particles was 10 nm to 20 nm, a thickness of the titanium dioxide layer was 20 nm to 40 nm.

After the titanium dioxide layer was formed, the carbon fiber felt was put in a palladium chloride aqueous solution with 0.15 mL of volume and 0.5 mg/L to 1 mg/L of concentration. After palladium ions were dispersed by a sonication, a sodium borohydride aqueous solution with 6 mL of volume and 12 mg/L of concertation was added the palladium chloride aqueous solution to perform a reduction reaction. After the reduction reaction was finished, the aforementioned carbon fiber felt was washed with distilled water and dried at 80° C. to obtain the carbon fiber composites.

Embodiments 2 to 5 and Comparative Embodiment 1

Embodiments 2 to 5 and comparative embodiment 1 were practiced with the same method as in embodiment 1 by changing amounts of the palladium chloride aqueous solution and the sodium borohydride aqueous solution. Specific conditions were shown in Table 1.

Evaluation Methods

1. Test of Particle Size of Nanoparticles of Transition Metal

The test of the particle size of the transition metal nanoparticles was performed by using electron microscope to observe the nanoparticles of the transition metal in the carbon fiber composites and measuring their particle size.

2. Test of Degradation of Organic Compounds

The test of degradation of organic compounds was performed by putting the carbon fiber composites with an area of 100×20 $mm^2$ on a bottom of 1 L beaker with a flat bottom, and adding 5000 mL of cyclic secondary amine solution to the beaker to make a height of liquid level be 0.8 mm. At a room temperature, the beaker was exposed with a light with 40 nm of wavelength from a white-light mercury lamp (or LED white light lamp) for 2 hours. Then, a drop of the cyclic secondary amine solution was put on a test paper of peroxide, and a color change of the test paper was observed. If the color of the test paper was changed to blue, the titanium dioxide layer of the carbon fiber composites has photocatalytic activity which promotes oxidation of the cyclic secondary amine.

3. Test of Decomposition of Water

The test of decomposition of water was performed by putting the carbon fiber composites with an area of on 50×20 $mm^2$ on a bottom of 1 L beaker with a flat bottom, and adding 250 mL of 20% methanol solution to the beaker to make a height of liquid level be 10 mm. The methanol solution was degassed three times and then was irradiated by a xenon lamp with a radiant energy per unit area of 50 $mW/cm^2$ for 1 hour. The hydrogen gas generated from the solution was then introduced to a gas phase chromatograph, and the flow rate of the hydrogen gas was measured with a thermal conductivity detector (TCD) to evaluate the effusion rate.

TABLE 1

| | | | Embodiments | | |
|---|---|---|---|---|---|
| | | | 1 | 2 | 3 |
| Producing condition | Palladium chloride aqueous solution | Volume (mL) | 0.15 | 0.3 | 0.8 |
| | | Concentration (mg/mL) | | 0.5~1 | |
| | Sodium borohydride aqueous solution | Volume (mL) | 6 | 12 | 32 |
| | | Concentration (mg/mL) | | 12 | |
| Evaluation | Test of particle size of nanoparticles of transition metal | Particle size(nm) | | 10 | |
| | Test of degradation of organic compounds | Color change of test paper | | bule | |
| | Test of decomposition of water | Effusion rate of hydrogen gas (μmol/gh) | 1243 | 1660 | 2964 |

TABLE 1-continued

|  |  |  | Embodiments | | Comparative embodiment |
| --- | --- | --- | --- | --- | --- |
|  |  |  | 4 | 5 | 1 |
| Producing condition | Palladium chloride aqueous solution | Volume (mL) | 1.5 | 3.2 | No used |
|  |  | Concentration (mg/mL) | 0.5~1 | | |
|  | Sodium borohydride aqueous solution | Volume (mL) | 60 | 128 | |
|  |  | Concentration (mg/mL) | 12 | | |
| Evaluation | Test of particle size of nanoparticles of transition metal | Particle size(nm) | 10 | | N/A |
|  | Test of degradation of organic compounds | Color change of test paper | bule | | Not blue |
|  | Test of decomposition of water | Effusion rate of hydrogen gas (μmol/gh) | 2469 | 1913 | 71 |

Note:
"N/A" represented that the test of particle size was not performed. The same palladium chloride aqueous solution was used in the embodiments 1 to 5, but the added volumes thereof were different from each other.

Referring to Table 1, compared with comparative embodiment 1 without using the reducing agent and the palladium chloride aqueous solution (i.e., no palladium nanoparticles), the colors of the test papers of the carbon fiber composites produced by embodiments 1 to 5 exhibited all blue, and the carbon fiber composites can photocatalysis the decomposition of water to generate hydrogen gas. In conclusion, the carbon fiber composites only produced by embodiments 1 to 5 have synergistically photocatalytic activity.

Moreover, referring to Table 1, according to the results of the effusion rate of the hydrogen gas in the test of the decomposition of water, the amount of palladium chloride aqueous solution affected the effusion rate, and the amount of 0.8 mL is the best. The palladium nanoparticles with a particle size of 10 nm can be formed by using 0.8 mL of the palladium chloride aqueous solution, and the palladium nanoparticles can be uniformly distributed on the outer surface of the titanium dioxide layer, therefor enhancing the synergistically photocatalytic activity of the carbon fiber composites.

In summary, in an application of the method for producing the carbon fiber composites of the present invention, in where by reducing the specific transition metal ions with the specific concentration, the method for producing the carbon fiber composites can form the nanoparticles of the transition metal on the outer surface of the titanium dioxide layer encapsulating the carbon fiber to produce the carbon fiber composites. The nanoparticles of the transition metal are direct contact with the titanium dioxide layer, so that the carbon fiber composites have synergistically photocatalytic activity.

Although the present invention has been disclosed in several embodiments as above mentioned, these embodiments do not intend to limit the present invention. Various changes and modifications can be made by those of ordinary skills in the art of the present invention, without departing from the spirit and scope of the present invention. Therefore, the claimed scope of the present invention shall be defined by the appended claims.

What is claimed is:

1. A method for producing carbon fiber composites, comprising:
   coating a titanium dioxide precursor on a carbon fiber and performing a sintering treatment to form a titanium dioxide layer on an outer surface of the carbon fiber;
   preparing a solution containing transition metal ions; and
   reducing the transition metal ions by using a reducing agent to form nanoparticles of a transition metal on an outer surface of the titanium dioxide layer, thereby producing the carbon fiber composites,
   wherein the transition metal is at least one selected from the group consisting of nickel, palladium and platinum, and a concentration of the solution is 0.1 mg/mL to 4.0 mg/mL.

2. The method for producing the carbon fiber composites of claim 1, wherein the carbon fiber comprises a polyacrylonitrile-based carbon fiber.

3. The method for producing the carbon fiber composites of claim 1, wherein a weight ratio of the titanium dioxide precursor and the carbon fiber is 10 to 40.

4. The method for producing the carbon fiber composites of claim 1, wherein a sintering temperature of the sintering treatment is 430° C. to 720° C.

5. The method for producing the carbon fiber composites of claim 4, wherein the sintering temperature of the sintering treatment is 450° C. to 700° C.

6. The method for producing the carbon fiber composites of claim 1, wherein a sintering period of the sintering treatment is 1 hour to 4 hours.

7. The method for producing the carbon fiber composites of claim 1, wherein the reducing agent comprises hydroboron.

8. The method for producing the carbon fiber composites of claim 1, wherein a concentration of the reducing agent is 0.25 mg/mL to 15 mg/mL.

9. The method for producing the carbon fiber composites of claim 1, wherein the concentration of the solution is 0.5 mg/mL to 1 mg/mL.

10. The method for producing the carbon fiber composites of claim 1, wherein a particle size of the nanoparticles is not larger than 20 nm.

11. The method for producing the carbon fiber composites of claim 10, wherein the particle size of the nanoparticles is 5 nm to 15 nm.

12. A carbon fiber composite, comprising:
   a carbon fiber;
   a titanium dioxide layer encapsulating the carbon fiber; and
   nanoparticles of a transition metal disposed on an outer surface of the titanium dioxide layer, wherein the transition metal is at least one selected from the group consisting of nickel, palladium and platinum, wherein a thickness of the titanium dioxide layer is 20 nm to 40 nm.

13. The carbon fiber composite of claim 12, wherein a particle size of the nanoparticles is not larger than 20 nm.

14. The carbon fiber composite of claim 13, wherein the particle size of the nanoparticles is 5 nm to 15 nm.

* * * * *